(12) United States Patent
Shaw

(10) Patent No.: US 9,229,445 B2
(45) Date of Patent: Jan. 5, 2016

(54) MOBILITY PRODUCT TRACEABILITY BUILDING SYSTEM AND PRODUCTION LINE OPERATION CONTROLLING METHOD

(71) Applicant: ROLAND TAIWAN ELECTRONIC MUSIC CORP., Taipei (TW)

(72) Inventor: Uei-Jong Shaw, Taipei (TW)

(73) Assignee: Roland Taiwan Electronic Music Corp., Taipei (TW)

( * ) Notice: Subject to any disclaimer, the term of this patent is extended or adjusted under 35 U.S.C. 154(b) by 401 days.

(21) Appl. No.: 13/762,484

(22) Filed: Feb. 8, 2013

(65) Prior Publication Data
US 2014/0121806 A1  May 1, 2014

(30) Foreign Application Priority Data
Oct. 25, 2012 (TW) .............................. 101139394 A

(51) Int. Cl.
G05B 15/00 (2006.01)
G01D 3/00 (2006.01)
G01P 21/00 (2006.01)
G06Q 10/00 (2012.01)
G05B 19/418 (2006.01)

(52) U.S. Cl.
CPC .. *G05B 19/4183* (2013.01); *G05B 2219/31304* (2013.01)

(58) Field of Classification Search
CPC ................................................ G05B 19/41875
USPC .................................. 700/1; 702/108; 705/305
See application file for complete search history.

(56) References Cited

U.S. PATENT DOCUMENTS

| | | | |
|---|---|---|---|
| 8,978,081 B2 * | 3/2015 | McClay ............... | H04N 17/004 348/181 |
| 2005/0043898 A1 * | 2/2005 | Linsen et al. ................... | 702/22 |
| 2008/0086246 A1 * | 4/2008 | Bolt et al. ........................ | 701/29 |
| 2012/0035876 A1 * | 2/2012 | Bertness ................ | G06Q 99/00 702/81 |
| 2012/0254046 A1 * | 10/2012 | Librizzi et al. ................. | 705/306 |
| 2013/0104158 A1 * | 4/2013 | Partee .................... | H04H 60/32 725/14 |
| 2013/0173428 A1 * | 7/2013 | Moser ......................... | 705/26.62 |
| 2014/0225630 A1 * | 8/2014 | Stethem et al. ............... | 324/691 |
| 2014/0343860 A1 * | 11/2014 | Egan .................. | G01N 21/8483 702/19 |

* cited by examiner

Primary Examiner — Ronald Hartman, Jr.
(74) Attorney, Agent, or Firm — Alan D. Kamrath; Kamrath IP Lawfirm, P.A.

(57) ABSTRACT

A mobility building product traceability system and a production line controlling method are used to set product information and to test quality of each product. The product traceability system includes a mobile electronics device used by an inspector and an ID (Identification) confirmation code inputted by the inspector. A storing unit is built in the mobile electronics device and has feature standards related to products built therein. At least one imaging apparatus is built in the mobile electronics device and applied to scan product serial number barcodes, product features, and two-dimensional barcodes associated with the products to receive, record or read production and test information of the products, and then store the production and test information in the storing unit.

4 Claims, 6 Drawing Sheets

MOBILITY PRODUCT TRACEABILITY BUILDING SYSTEM AND PRODUCTION LINE OPERATION CONTROLLING METHOD

BACKGROUND OF THE INVENTION

1. Field of the Invention

The present invention relates to a mobility building product traceability system and a production line controlling method used to set product resume and to integrate information with mobility equipment by using a cloud technology to directly read cloud data and to lower manual inputting operation, thus enhancing processing efficiency.

2. Description of the Prior Art

A conventional production process at a factory is applied to understand a producing state of products in a production line to control product quality and to manage the production process. However, operators in the production line have to manually record each producing state, so when an abnormal state happens, a foreman has to check production records recorded by the operators, thus postponing information transmission between the operators and the foreman and lowering production efficiency. In addition, such a production control method cannot reflect the abnormal state of the production line immediately. To overcome such problems, a product resume setting method is developed.

However, the products resume setting method is used in a testing process of finished products by a manual input and contains the steps of:

1) manually distinguishing whether a color, an appearance shape, and size of the products is in a certain range or easily calculating a size and position of parts and accessories;

2) computerizing and manually inputting data into a computer in turn;

3) manually inquiring a standard specification of finished products by the operator testing the finishing products;

4) manually inputting a testing result of the finished products and related data by the operator;

5) manually inputting a testing result of qualified products and defective products by the operator; and 6) manually inputting a repairing result of the defective products by the operator.

Thereby, production efficiency cannot be enhanced, because all data is inputted manually in the data inputting process. Also, a barcode scanner scans barcodes of the products and packaging materials to further store acquired data. Yet, the operator has to hold the barcode scanner with one hand and to hold the product with the other hand, thus causing operation inconvenience.

Also, the above-mentioned steps are only used for testing the finishing products. If an abnormal problem occurs, the operator has to manually acquire related testing data of the finished products to find defective products. Moreover, the problems of the defective products and related data have to be manually recorded in a work log or to be inputted into a computer, thus wasting time and reducing efficiency.

The present invention has arisen to mitigate and/or obviate the afore-described disadvantages.

SUMMARY OF THE INVENTION

The primary object of the present invention is to provide a mobility building product traceability system and a production line controlling method used to set product information and to test quality of each product.

A secondary object of the present invention is to provide a mobility building product traceability system and a production line controlling method in which a mobile electronics device (such as iPad or smart phone) acquires barcode information directly and completes the file setting process.

A further object of the present invention is to provide a mobility building product traceability system and a production line controlling method in which the mobile electronics device is mounted at a fixed position. Thus, a user acquires a product with barcodes, and, then, the barcode is scanned to finish the file setting process.

Another object of the present invention is to provide a mobility building product traceability system and a production line controlling method in which the mobile electronics device (such as iPad or smart phone) matches with WiFi. The mobile electronics device is placed on the production line and is connected with the cloud database, and real time information of the production line is uploaded to the cloud database and is integrated with the host computer. Preferably, the application (app) is made to directly read cloud information to lower manual inputting operations.

A product traceability system of the present invention comprises a mobile electronics device used by an inspector and an ID (Identification) confirmation code inputted by the inspector;

a storing unit built in the mobile electronics device and having feature standards related to products built therein;

at least one imaging apparatus built in the mobile electronics device and applied to scan product serial number barcodes, product features, and two-dimensional barcodes associated with the products to receive, record or read production and test information of the products, and then to store the production and test information in the storing unit.

In one embodiment, the mobility building product traceability system and the production line further comprises a network server to connect with a cloud database, to real time update test standards of other products, and to upload each testing result.

In one embodiment, the two-dimensional barcodes contains specification barcodes, CD barcodes, warning text barcodes, operation manual barcodes, simple instructions barcode, carton barcodes, and transformer barcodes.

In one embodiment, the product features contains color contrast, appearance size, printing quality, and part assembly accuracy.

Also, a production line controlling method of the present invention is used for setting product information and for testing a quality of each product. The controlling method comprises the steps of: a) inputting an operator's ID confirmation code; b) contacting with a cloud database to confirm whether the operator's data is correct; c) contacting the cloud database to find an undelivered product list; d) selecting a delivery list; e) downloading the delivery list to a storing unit; f) outputting a serial number barcode of a delivered product; g) checking whether the serial number barcode matches with the delivered product; h) confirming whether a checking process is finished; i) shooting loading pictures; j) uploading the serial number and the loading pictures to the cloud database; and k) integrating product information including serial number, operator, production line, finished time, annex state, export list, check status of defective products, and repair status of the defective products.

In one embodiment, the check status of the defective products contains a preliminary detection status and a retest qualification status of the defective products.

In one embodiment, the preliminary detection status of the defective products contains steps of scanning the operator's ID; scanning serial number barcodes of the defective products; inputting defective state codes and contents; uploading to the cloud database; and ending operation.

In one embodiment, the retest qualification status contains steps of scanning the operator's ID; scanning the serial number barcodes of the defective products; inputting "pass inspection"; uploading to the cloud database; and ending operation.

In one embodiment, the repairing status of the defective products contains confirming content status and repairing status of the defective products.

In one embodiment, the confirming content status of the defective products contains steps of inputting a repairer's ID; scanning the serial number barcodes of the defective products; confirming defective state; and repairing the defective products.

In one embodiment, the confirming repairing status of the defective products contains steps of inputting the repairer's ID; scanning the serial number barcodes of the defective products; inputting defective reasons and operation units; shooting states of the defective products; and uploading serial numbers, pictures, and reasons of the defective products to the cloud database.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
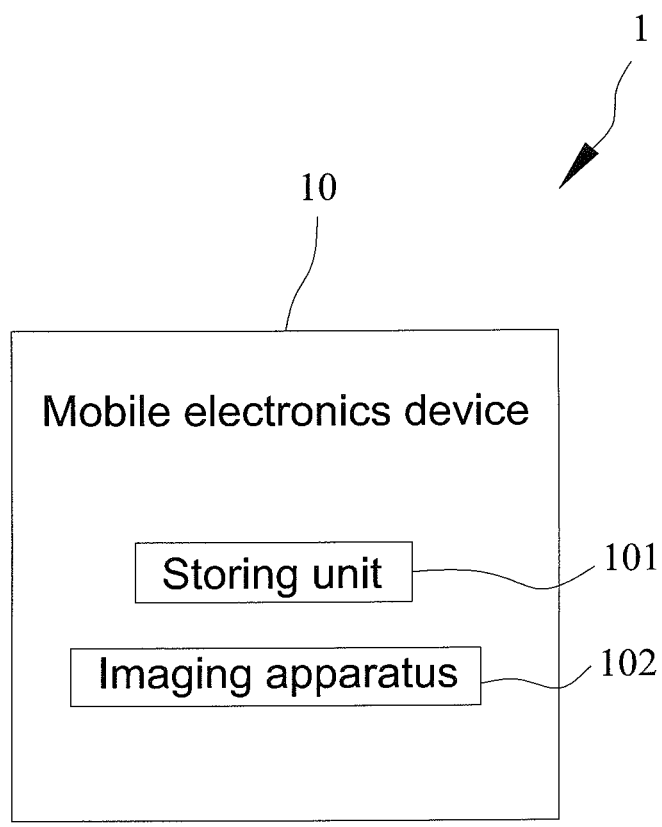
FIG. 1 is a diagram of a product traceability system according to a preferred embodiment of the present invention.

FIG. 1 is a diagram of a product traceability system according to a preferred embodiment of the present invention. A mobility building product traceability system and a production line controlling method of the present invention are used to set product information and to test quality of each product. A product traceability system 1 comprises a mobile electronics device 10 used by an inspector and an ID (Identification) confirmation code inputted by the inspector. A storing unit 101 is built in the mobile electronics device 10 and has feature standards related to products built therein. At least one imaging apparatus 102 is built in the mobile electronics device 10 and applied to scan product serial number barcodes, product features, and two-dimensional barcodes associated with the products to receive, record or read production and test information of the products, and then to store the production and test information in the storing unit 101. The two-dimensional barcodes contains specification barcodes, CD barcodes, warning text barcodes, operation manual barcodes, simple instructions barcode, carton barcodes, and transformer barcodes. The product features contains color contrast, appearance size, printing quality, and part assembly accuracy. The above-mentioned structure is only for a single version. The product serial number barcodes, the product features, and two-dimensional barcodes associated with the products are scanned by the at least one imaging apparatus 102 to acquire related information. Thereafter, the related information is stored in the storing unit 101 and is stored in a computer to be filed in the system.

Furthermore, the mobile electronics device 10 matches with a network server (WiFi function) to connect with a cloud database, to real time update test standards of other products, and to upload each testing result. The mobile electronics device 10 is placed on a production line and is connected with a cloud system. Real time information of the production line is uploaded to the cloud system and is integrated with a host computer. Preferably, an application (app) is made to directly read cloud information so as to lower manual inputting operation. In addition, an imaging apparatus 102 (with high pixel camera lens) serves beforehand to acquire a sample picture to compare the sample picture with an object. A printing quality and color elements of an identified object are checked easily to replace a part of manual visual inspection, thus enhancing processing efficiency. Preferably, a shape is identified or a size is calculated easily. Also, the mobility building product traceability system not only is used in checking individual parts but also compares an assembly accuracy of a finished product.

Figure 2:
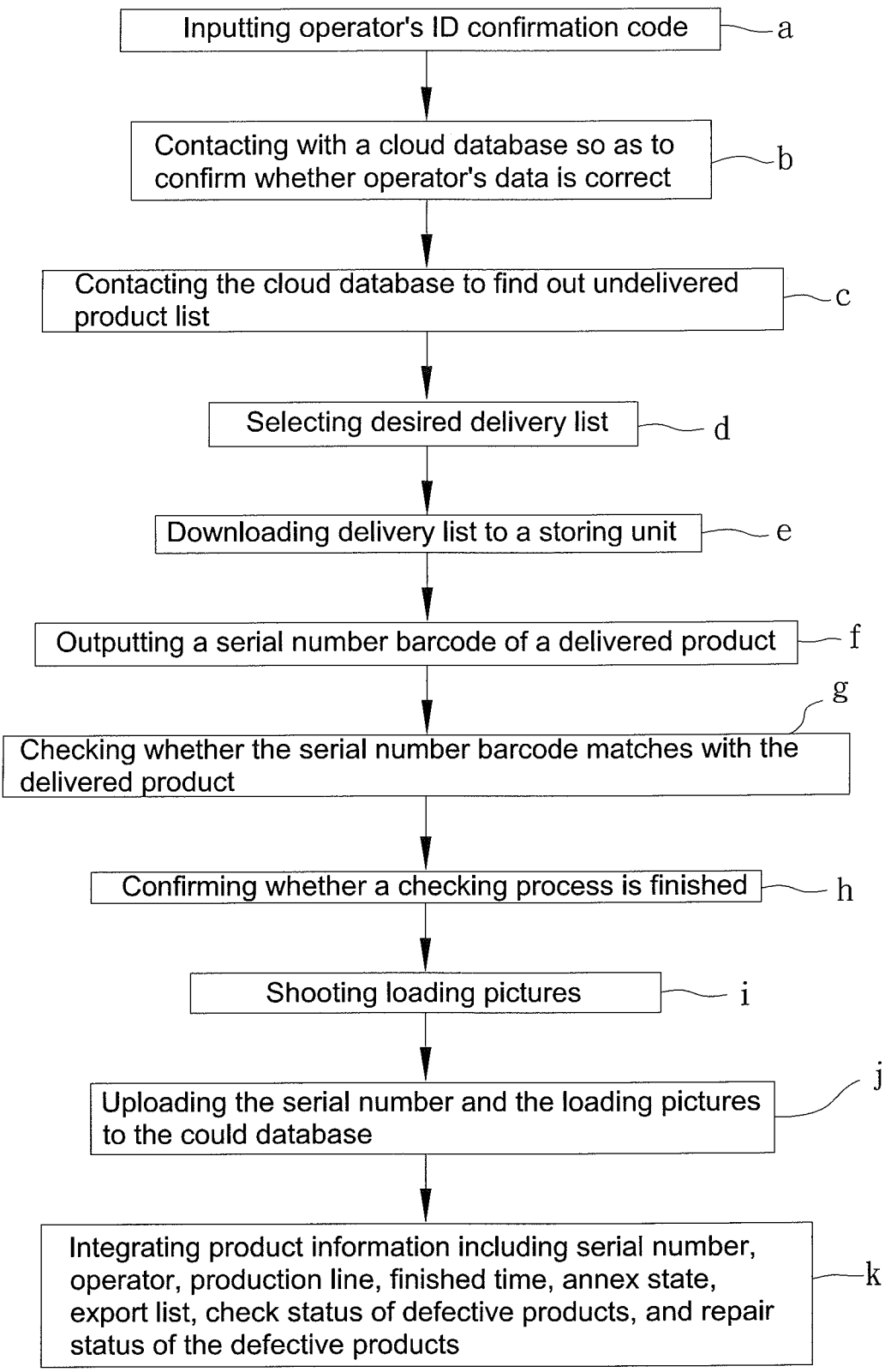
FIG. 2 is a flow chart of a production line operation controlling method according to a preferred embodiment of the present invention.

FIG. 2 is a flow chart of a production line operation controlling method according to a preferred embodiment of the present invention. The production line operation controlling method of the present invention is used for setting product information and for testing a quality of each product. The controlling method comprises steps of a) inputting an operator's ID confirmation code; b) contacting with a cloud database to confirm whether the operator's data is correct; c) contacting the cloud database to find an undelivered product list; d) selecting a delivery list; e) downloading the delivery list to a storing unit; f) outputting a serial number barcode of a delivered product; g) checking whether the serial number barcode matches with the delivered product; h) confirming whether a checking process is finished; i) shooting loading pictures; j) uploading the serial number and the loading pictures to the cloud database; and k) integrating product information including serial number, operator, production line, finished time, annex state, export list, check status of defective products, and repair status of the defective products.

Figure 3:
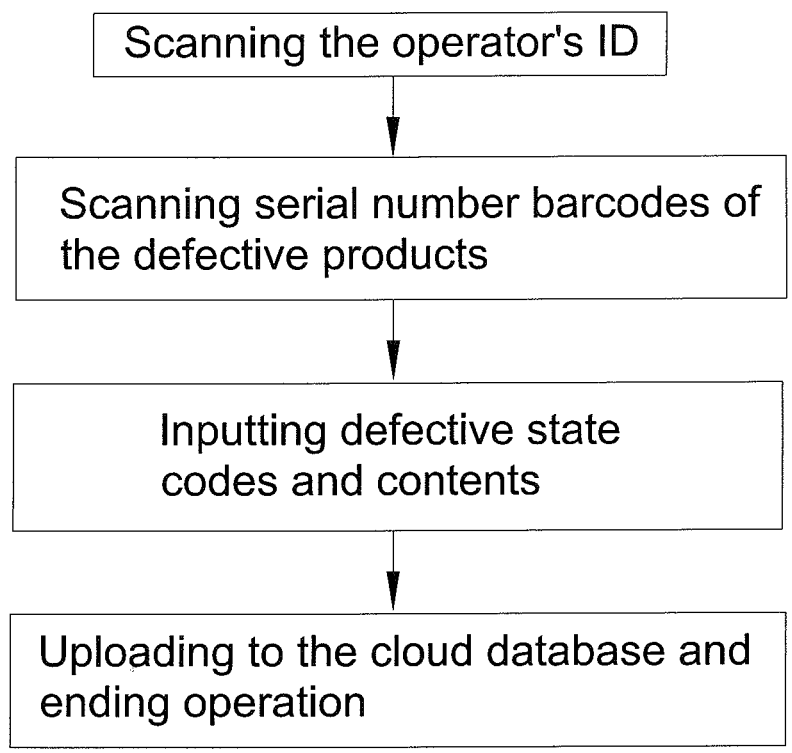
FIG. 3 is a flow chart of a preliminary detection status of the defective products according to the preferred embodiment of the present invention.
Figure 4:
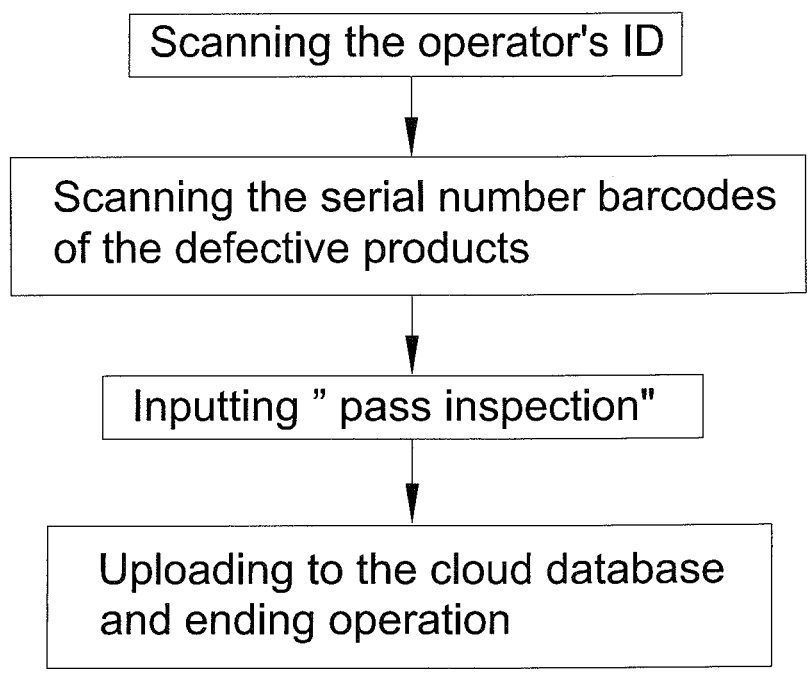
FIG. 4 is a flow chart of a retest qualification status of the defective products according to the preferred embodiment of the present invention.

In step k, the check status of the defective products contains a preliminary detection status and a retest qualification status of the defective products. FIG. 3 is a flow chart of a preliminary detection status of the defective products according to the preferred embodiment of the present invention. The preliminary detection status of the defective products contains steps of scanning the operator's ID; scanning serial number barcodes of the defective products; inputting defective state codes and contents; uploading to the cloud database; and ending operation. FIG. 4 is a flow chart of a retest qualification status of the defective products according to the preferred embodiment of the present invention. The retest qualification status contains steps of scanning the operator's ID; scanning the serial number barcodes of the defective products; inputting "pass inspection"; uploading to the cloud database; and ending operation.

By ways of the preliminary detection status and the retest qualification status of the defective products, the defective products are classified effectively to understand a quantity and questions related to the defective products which will be repaired and a quantity and questions related to the defective products which will be scrapped (such process connects with the cloud database to achieve real-time information synchronically). Thereafter, repaired defective products are retested, and information of the repaired defective products which pass inspection is uploaded to the cloud database.

Figure 5:
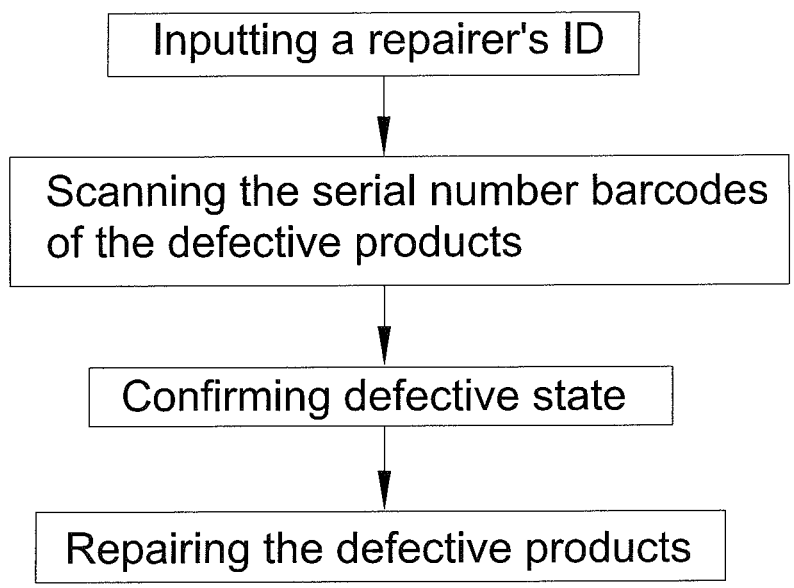
FIG. 5 is a flow chart of confirming a content status of the defective products according to the preferred embodiment of the present invention.
Figure 6:
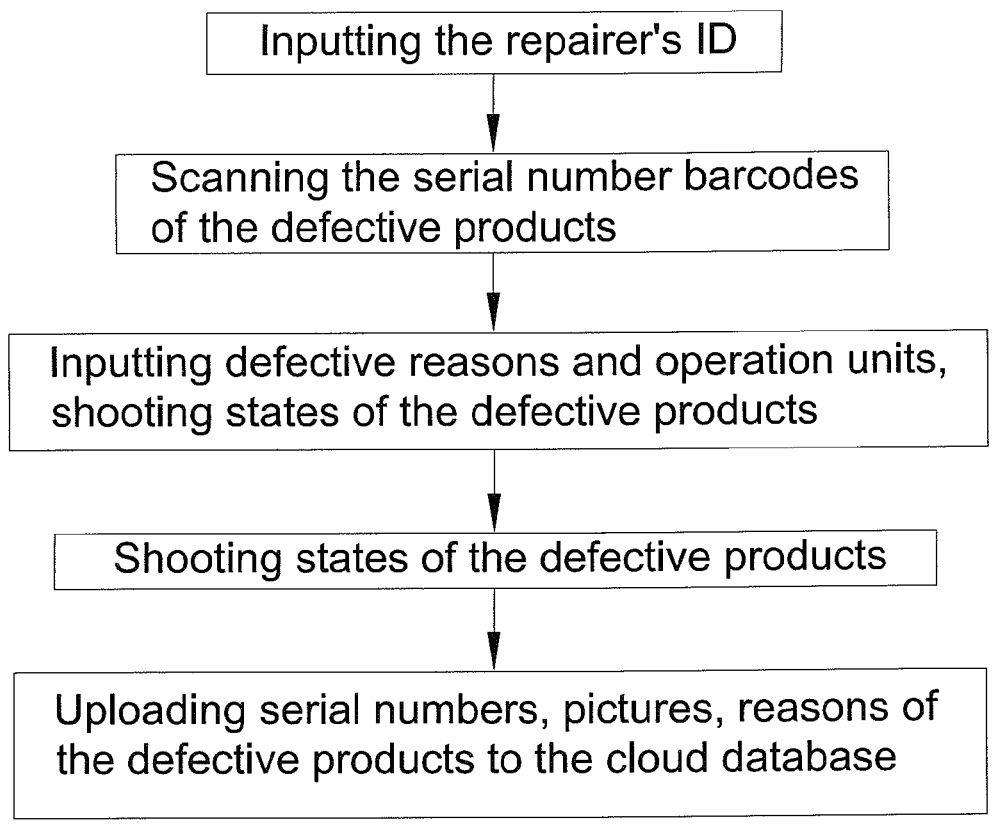
FIG. 6 is a flow chart of confirming the repairing status of the defective products according to the preferred embodiment of the present invention.

A repairing status of the defective products contains confirming content status and repairing status of the defective products. FIG. 5 is a flow chart of confirming a content status of the defective products according to the preferred embodiment of the present invention. The confirming content status of the defective products contains steps of inputting a repairer's ID; scanning the serial number barcodes of the defective products; confirming the defective state; and repairing the defective products. FIG. 6 is a flow chart of confirming the repairing status of the defective products according to the preferred embodiment of the present invention. The confirming repairing status of the defective products contains steps of inputting the repairer's ID; scanning the serial number barcodes of the defective products; inputting defective reasons and operation units; shooting states of the defective products; and uploading serial numbers, pictures, reasons of the defective products to the cloud database.

Thereby, the mobile electronics device (such as iPad or smart phone) matches with WiFi. The mobile electronics device is placed on the production line and is connected with the cloud database, and real time information of the production line is uploaded to the cloud database and is integrated with the host computer. Preferably, the application is made to directly read cloud information to lower manual inputting operation.

While various embodiments in accordance with the present invention have been shown and described, it is clear to those skilled in the art that further embodiments may be made without departing from the scope of the present invention.

What is claimed is:

1. A mobility building product traceability system comprising:
    a mobile electronics device used by an inspector and an ID (Identification) confirmation code inputted by the inspector;
    a storing unit in the mobile electronics device and having feature standards related to products built therein; and
    at least one imaging apparatus in the mobile electronics device and applied to scan product serial number barcodes, product features, and two-dimensional barcodes associated with the products to receive, record or read production and test information of the products, and then to store the production and test information in the storing unit, wherein the two-dimensional barcodes contains specification barcodes, CD barcodes, warning text barcodes, operation manual barcodes, simple instructions barcode, carton barcodes, and transformer barcodes.

2. The mobility building product traceability system as claimed in claim 1 further comprising a network server to connect with a cloud database, to real time update test standards of other products, and to upload each testing result.

3. A mobility building product traceability system comprising:
    a mobile electronics device used by an inspector and an ID (Identification) confirmation code inputted by the inspector;
    a storing unit in the mobile electronics device and having feature standards related to products built therein; and
    at least one imaging apparatus in the mobile electronics device and applied to scan product serial number barcodes, product features, and two-dimensional barcodes associated with the products to receive, record or read production and test information of the products, and then to store the production and test information in the storing unit, wherein the product features contain color contrast, appearance size, printing quality, and part assembly accuracy.

4. The mobility building product traceability system as claimed in claim 3 further comprising a network server to connect with a cloud database, to real time update test standards of other products, and to upload each testing result.

* * * * *